Patented Sept. 7, 1948

2,448,715

UNITED STATES PATENT OFFICE 2,448,715

CONDENSATION PRODUCTS OBTAINED FROM ANACARDIC MATERIALS

Mortimer T. Harvey, South Orange, N. J., assignor to The Harvel Corporation, a corporation of New Jersey No Drawing. Application August 25, 1945, Serial No. 612,714

4 Claims. (Cl. 260—473)

This invention relates to novel compositions of matter and to methods for preparing and using the same. In its more specific aspect the invention is directed to novel organic condensation reaction products of anacardic materials and organic chlorides. More particularly the invention is directed to organic condensation reaction products of an anacardic material such as cashew nut shell liquid and the distillates of cashew nut shell liquid with a hydrocarbon polychloride having at least one alkyl group, having at least one of its chlorine atoms on a terminal carbon of said alkyl group and having at least two carbon atoms. Said hydrocarbon polychloride may be either aliphatic or aromatic-aliphatic, examples of which are trichlor propane, polychloro pentane (produced by the chlorination of dichloro pentane), 1,2,2-trichlor ethane, dichlor pentane, trichlor ethylene, orthochlor benzyl chloride, tetrachlor ethane, dichlor diphenyl trichloroethane, 1-orthochlor phenyl 2-chlor-ethane, and so forth.

In carrying out this invention the anacardic material used may be the raw cashew nut shell liquid obtained by the solvent extraction of said liquid from the cashew nuts or by the extraction of said liquid from said nuts by the use of a hot cashew nut shell liquid bath as set forth in the U. S. Patent to E. R. Hughes 2,058,456, of October 27, 1936; or it may be the so-called treated cashew nut shell liquid obtained after the raw cashew nut shell liquid has been treated to reduce its vesicant action and to remove the naturally occurring metals therein as set forth in the patent to Harvey-Damitz No. 2,128,247, of August 30, 1938, and to Harvey-Damitz No. 2,067,919, of January 19, 1937, to which reference is hereby made, or it may be either the raw or treated cashew nut shell liquid which has been steam distilled or distilled under vacuum at about 500° F.–600° F. to remove the more volatile constituents which measure about 5% by weight of the liquid treated.

The anacardic material employed in this invention may also be the distillates from cashew nut shell liquid which may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled preferably at between 600° F.–700° F. or distilled under sub-atmospheric pressure conditions and preferably below about 50 mm. of mercury pressure and temperatures between about 400° F.–700° F. When distilled under reduced pressure of about 50 mm. of mercury it is preferred to employ temperatures between about 525° F. and 700° F. and when distilled under reduced pressure of about 10 mm. of mercury it is preferred to employ a temperature of about 450° F. By whatever method employed, the distillation is continued until the quantity by weight of the distillate is between about 25% to about 75% of the quantity by weight of the cashew nut shell liquid. The distillates thus obtained for the most part consist of a phenol having an unsaturated hydrocarbon substituent having more than 13 and approximately 15 carbon atoms and having a boiling point of approximately 225° C. at 10 mm. of mercury pressure. Of these distillates I prefer to employ those produced by vacuum distillation, thus eliminating the use of steam or the like.

In carrying out this invention one or a mixture of two or more of said anacardic materials is reacted with one or a combination of two or more of said hydrocarbon polychlorides. The reaction is generally carried out by forming a mixture of the reactants and adding thereto a quantity of an alkali such as sodium hydroxide, potassium hydroxide or the like, preferably in water solution. The mixture preferably consists of the reactants in the following proportions: at least one mole of the alkaline hydroxide to each mole of said anacardic material. The quantity of the hydrocarbon polychloride may vary over wide limits but is preferably between about 1 to 2 moles thereof to each mole of the anacardic material. After the mixture has been prepared, it is heated to elevated temperatures of at least 90° C. and is constantly maintained at this temperature until the novel organic condensation reaction product is produced. By employing more than one molecular proportion of the polychloride per mole proportion of sodium hydroxide, the reaction will be found to be complete when the reaction mass is acid. The reaction may be carried out by boiling the mix at atmospheric pressure under an ordinary reflux condenser or by heating the mix in a closed container until the pressure therein is superatmospheric and may be as high as 100 lbs. per sq. in. or higher. In general it requires about 2 to 5 hours to produce a reasonably satisfactory yield of the condensation reaction product. When the hydrocarbon polychloride has an unsaturated group next to the terminal carbon having a carbon of another alkyl group attached thereto, it is preferably to prolong this heating up to from 60 to 100 hours to obtain high yields. When trichlor ethylene is employed, I prefer that the reaction be carried out at 100 lbs. pressure and for a period of about 60 hours.

The following examples are given by way of illustrating the invention and are not to be construed in a limiting sense, all parts being given by weight unless otherwise indicated.

Example 1

To about 300 parts of one of said distillates of cashew nut shell liquid are added 45 parts of sodium hydroxide dissolved in 125 parts of water. This mixture is agitated until it is substantially uniform. Then there are added thereto 150 parts of trichlor propane and the entire mass is now agitated to form a uniform mixture. This mixture is placed in an autoclave and heated until the pressure therein is between about 30–100 lbs. per sq. in. and is maintained in this condition for a period of about 15 hours. The mix is allowed to cool and then it is neutralized and allowed to stand whereupon it separates into two main layers: an aqueous layer and an oily layer. The oily layer is removed from the aqueous layer, has a specific gravity of 1.063, is insoluble in water, has a chlorine content of 5.95%, is soluble in varnolene and when mixed with about 8% by weight of hexamethylene tetramine and this mixture maintained at 105° C. for 16 hours will still be in the liquid state though heavier.

*Example 2*

Following the same procedure as that set forth in Example 1 with the sole exception that instead of 150 parts of trichlor propane, 200 parts of polychloro pentane is employed, the oily condensation product produced had a specific gravity of 1.030, is insoluble in water, has a chlorine content of 11.87%, is soluble in varnolene and when mixed with about 8% of hexamethylene tetramine and this mixture maintained at 105° C. for 16 hours is still in the liquid state with very little change in viscosity.

*Example 3*

Followng the same procedure as that set forth in Example 1 except that 300 parts of treated cashew nut shell liquid and 150 parts of dichlor pentane are used instead of the distillate of cashew nut shell liquid and trichlor propane, the resultant oily liquid reaction product produced had a specific gravity of 1.030, is insoluble in water, has a chlorine content of 9.08%, is soluble in varnolene and when mixed with 8% of hexamethylene tetramine and this mixture maintained at 105° C. for 16 hours showed a very slight change in viscosity.

*Example 4*

Following the same procedure as that set forth in Example 1 with the sole exception being that 150 parts of trichlor ethylene is employed in place of the trichlor propane, the resultant oily reaction product produced had a specific gravity of 0.983, was insoluble in water, soluble in varnolene, had a chlorine content of 3.2% and when mixed with 8% by weight of hexamethylene tetramine and maintained at 105° C. for 16 hours it showed a very slight change in viscosity.

*Example 5*

Following the same procedure as that set forth in Example 1 with the sole exception being that instead of trichlor propane, 100 parts of ethylene dichloride is employed, the oily reaction product produced had a specific gravity of 1.2, was insoluble in water, soluble in varnolene, had a chlorine content of 4.2% and when mixed with 8% by weight of hexamethylene tetramine and maintained at 105° C. for 16 hours showed only a little change in viscosity.

*Example 6*

Following the same procedure as that set forth in Example 1 with the exceptions being that instead of employing trichlor propane, 135 parts of orthochlor benzyl chloride is employed and the reaction is carried out by boiling under a reflux condenser at atmospheric pressure instead of under super-atmospheric pressure as set forth in Example 1 and the time of boiling is 2 to 3 hours, the oily reaction product produced has a specific gravity of 1.063 is insoluble in water, soluble in varnolene, had a chlorine content of 9.2% and when mixed with 8% by weight of hexamethylene tetramine and maintained at 105° C. for 16 hours showed only a very slight change in viscosity.

*Example 7*

Following the same procedure as that set forth in Example 6 and employing 360 parts of dichlor diphenyl trichloroethane in place of the orthochlor benzyl chloride, the oily reaction product produced had a specific gravity of 1.10, is insoluble in water, soluble in varnolene, had a chlorine content of 12.9% and when mixed with 8% by weight of hexamethylene tetramine and maintained at 105° C. for 16 hours showed only a very slight change in viscosity.

These novel oily, liquid organic condensation reaction products all contain chlorine and the chlorine content may be between about 1% to 16% based on the total weight of the reaction product. They have better solvent properties for both natural as well as the so-called synthetic rubbers than do the aliphatic hydrocarbon ethers of the corresponding anacardic materials. When compounded with said rubbers and especially with the synthetic rubbers such as "Buna-S," "Buna-N" and "neoprene" being respectively the copolymers of butadiene and styrene, copolymers of butadiene and acrylonitrile and rubbery polymers of 2-chlor butadiene, they impart thereto high tensile strength as well as high tear strength.

The following is an illustrative example of a so-called synthetic rubber compounded with one of said novel organic condensation reaction products.

*Example A*

| | Parts |
|---|---|
| "Buna-N" | 100 |
| Zinc oxide | 5 |
| "Gastex" (carbon black) | 40 |
| "Agerite" (antioxidant) | 1 |
| "Altax" (Benzothiazyl disulphide) | 1.5 |
| Sulphur | 2 |
| A novel organic condensation reaction product examples of which are shown in Examples 1 to 7 | 5 to 60 |

These ingredients are mixed and milled together until a uniform mixture is obtained and thereafter cured for a period of 15 to 60 minutes at about 300° F.

In some instances these novel organic condensation reaction products may be employed as intermediates capable of being hydrolyzed in order that the chlorine may be replaced with the OH group. They have increased fire resistance and are particularly suitable as plasticizers for inflammable materials. They are excellent plasticizers for resins and particularly the oil soluble phenol-formaldehyde resins and impart flexibility as well as improved impact strength to the known phenol-formaldehyde resins and especially those used in the manufacture of molded brake linings.

These novel organic condensation reaction products can be employed in the field of insecticides either alone or in combination with derris root extract, rotenone, pyrethrum, "DDT" (dichlor diphenyl trichloroethane) or the like and used either alone or in said combination, find particular application as an insecticidal spray. For employment in this field they can also be thinned either alone or in combination with a solvent such as kerosene or the like or they may be emulsified with water with or without kerosene together with an emulsifying agent such as a soap, for example sodium oleate.

The following is an illustrative example of an insecticidal spray compounded with one of said novel organic condensation reaction products.

*Example B*

To 35 parts of one of the novel reaction products, examples of which are described in Examples 1 to 7, is added 5 to 6 parts of derris root extract (containing approximately 30% rotenone), rotenone, pyrethrum or "DDT" and a substantially uniform dispersion or solution is produced.

These novel condensation reaction products also find particular use in the paint and varnish field and also in the field of molding compositions, brake linings and the like. In the paint and varnish field they find particular application as fungicidal and insecticidal paints. The following are examples of paints which are particularly useful in dairy farms because of their fungicidal and insecticidal characteristics.

*Example C*

70 parts of linseed oil is heated to about 600° F. until the desired body is obtained. Then there is added thereto 25 parts of ester gum and 30 parts of one of said novel condensation reaction examples of which are described in Examples 1 to 7. The entire mix is stirred and then allowed to cool to about 350° F. whereupon the desired quantity of driers and thinners are added thereto. The mass is allowed to cool to room temperature and to each gallon of said mass is uniformly distributed about 2 pounds of powdered aluminum. If desired, after the mass including the driers and thinners attain a temperature of about 200° F.–250° F. in the course of cooling and before the addition of the aluminum powder, there may be added thereto 20 parts of the product of Example B.

*Example D*

100 parts of linseed oil is heated until the desired body is obtained. Then there is added thereto 25 parts of ester gum which is mixed therein and the mass is allowed to cool. At around 350° F. thinners to 50% solids are added then driers are added equivalent to 5% manganese resinate and after cooling to room temperature 2 parts aluminum powder is added per gallon. If desired, after the mass including the driers and thinners attain a temperature of about 200° F.–250° F. in the course of cooling and before the addition of the aluminum powder, there may be added thereto 20 parts of the product of Example B.

The following example is illustrative of the use of these novel organic condensation reaction products as a laminating and coating material.

*Example E*

85 parts of a fusible resin in alcohol and containing 50%–60% solids and prepared by reacting cresylic acid with formaldehyde in the presence of ammonia with the mole ratio of cresylic acid to formaldehyde being approximately 1 to 1, and 15 parts of one of said novel organic condensation reaction products of Examples 1 to 7 are mixed and dissolved in ethyl alcohol. Then at room temperature this solution may be applied as a thin layer to 2–3 mil kraft paper. This coated kraft paper may be dried at from 250° F.–280° F. until dry to the touch. They may be further heated and converted to the infusible state where they find application as a coating. They also may be used as a coating material for other substances such as metal, wood and the like. They also may be employed as a laminating composition between any two surfaces composed of the materials above set forth and also may be used as impregnating compositions.

By following the procedure set forth in Examples 1–7 the reaction of the anacardic material and the hydrocarbon polychloride is continued in the presence of the alkaline condensing agent until the amount of oily condensation reaction product produced measures by weight at least about 25% of the weight of the anacardic material employed in the reaction and in some cases the yield is above 90%.

Having thus described my invention, what I claim and desire to protect by Letters Patent is:

1. An oily organic condensation reaction product obtained by reacting under alkaline conditions an anacardic material selected from the group consisting of cashew nut shell liquid and distillates of cashew nut shell liquid, said distillates having a boiling point of about 225° C. at 10 mm. of mercury pressure with a hydrocarbon polychloride having at least one alkyl group, having at least one of its chlorine atoms on a terminal alkyl group and having at least two carbon atoms.

2. An oily organic condensation reaction product obtained by reacting under alkaline conditions an anacardic material selected from the group consisting of cashew nut shell liquid and distillates of cashew nut shell liquid, said distillates having a boiling point of about 225° C. at 10 mm. of mercury pressure with ortho chlor benzyl chloride.

3. An oily organic condensation reaction product obtained by reacting under alkaline conditions an anacardic material selected from the group consisting of cashew nut shell liquid and distillates of cashew nut shell liquid, said distillates having a boiling point of about 225° C. at 10 mm. of mercury pressure with polychlor pentane.

4. An oily organic condensation reaction product obtained by reacting under alkaline conditions an anacardic material selected from the group consisting of cashew nut shell liquid and distillates of cashew nut shell liquid, said distillates having a boiling point of about 225° C. at 10 mm. of mercury pressure with ethylene dichloride.

MORTIMER T. HARVEY.

REFERENCES CITED

The following references are of record in the file of this patent:

UNITED STATES PATENTS

| Number | Name | Date |
| --- | --- | --- |
| 2,073,010 | Holt | Mar. 9, 1937 |
| 2,186,367 | Coleman | Jan. 9, 1940 |
| 2,240,034 | Caplan | Apr. 29, 1941 |